United States Patent
Nakatani et al.

[11] Patent Number: 5,546,854
[45] Date of Patent: Aug. 20, 1996

[54] APPARATUS FOR HEATING AND STERILIZING FOOD

[75] Inventors: Masayuki Nakatani, Nagoya; Koji Sengoku, Chiba-ken; Akifumi Fujita, Ichihara, all of Japan

[73] Assignee: House Foods Corporation, Osaka, Japan

[21] Appl. No.: 490,885

[22] Filed: Jun. 15, 1995

[30] Foreign Application Priority Data

Jun. 16, 1994 [JP] Japan .................................. 6-134658
Oct. 31, 1994 [JP] Japan .................................. 6-267365

[51] Int. Cl.⁶ .................................................. A23L 3/00
[52] U.S. Cl. ............................ 99/470; 99/361; 99/483; 426/511; 426/521
[58] Field of Search ............................ 426/521, 511, 426/524; 99/470, 361, 483

[56] References Cited

U.S. PATENT DOCUMENTS 3,951,131  4/1976  Houfek .................... 426/511
4,196,225  4/1980  Mencacci ................. 426/523
4,636,395  1/1987  Robinson, Jr. et al. ... 426/521
4,773,321  9/1988  Wijts ....................... 99/470

FOREIGN PATENT DOCUMENTS 2559354   8/1985   France .
49-71177  7/1974   Japan .
51-42391  4/1976   Japan .
64-51069  2/1989   Japan .
4-370081  12/1992  Japan .

Primary Examiner—George Yeung
Attorney, Agent, or Firm—Popham, Haik, Schnobrich & Kaufman, Ltd.

[57] ABSTRACT

In the apparatus and method of the present invention, the solid food to be sterilized is exposed to the steam so that the steam flow directly hits the food. In the another aspect of the invention, the heating and sterilizing chamber for heating and sterilizing the food comprises drain means for draining the unnecessary fluid therefrom. As a result of that, the temperature of the food can be raised uniformly, so that the sterilization of the food without degrading the quality of the food is attainable.

1 Claim, 11 Drawing Sheets

5,546,854

APPARATUS FOR HEATING AND STERILIZING FOOD

BACKGROUND OF THE INVENTION

1. Field of the Invention

This invention relates to a method and apparatus for heating and sterilizing food and, more particularly, to a food heating and sterilizing method and apparatus adapted to heat and sterilize food which is in open or unsealed condition.

2. Prior Art

Conventionally, solid food is generally heated and sterilized under pressure after the food is filled in sealed containers. However, with such a conventional method of sterilization, the food can be susceptible to bear an odor specific to retort treatment because it is mostly contained in such sealed containers and/or requires a particularly long processing time because the food has to be heated with air contained in sealed containers.

A number of different methods have been proposed to solve this problem. For example, Japanese Patent Laid-Open Publication No. 4-370081 discloses a method of filling boiled rice into containers, heating and sterilizing it under pressure and thereafter sealing the containers under an aseptic condition.

On the other hand, a variety of sterilizing apparatuses are already known for successively feeding food into a sealed sterilizing chamber for heating and sterilizing the food at high temperature or at high temperature and under high pressure, including those disclosed in Japanese Patent Laid-Open Publication Nos. 49-71177, 51-42391 and 64-51069. With any of these sterilizing apparatuses, however, a conveyor means has to be arranged within the food heating and sterilizing chamber of the apparatus in order to advance the food fed to the apparatus further into the chamber. A conveyor means arranged within a sealed chamber can make the entire configuration of the apparatus rather complicated and disadvantageous from the viewpoint of maintaining the chamber in an aseptic state.

With the method disclosed in Japanese Patent Laid-Open Publication No. 4-370081, the food is simply sterilized in a pressurized steamy atmosphere and, when solid food such as a lump of boiled rice containing a large number of small void spaces therein is to be sterilized, air remaining in those spaces can prevent any quick and efficient sterilization from taking place.

Additionally, air remaining in small void spaces can interfere with uniform temperature rise (distribution) in the food. Thus, if excessive heat is applied to the food to raise the temperature of the center of the food to a sufficiently high level for sterilization, the surface of the food can become discolored and the food itself can be degraded through the excessive heating.

On the other hand, a variety of food heating and sterilizing apparatuses have been proposed to successively move packages of food into a sealed and heated sterilizing chamber without arranging a conveyor means in the chamber in view of the problems that may arise in known food heating and sterilizing apparatuses comprising a sterilizing chamber in which a conveyor means is installed. For example, U.S. Patent Application Ser. No. 08/395,111 filed on Feb. 27, 1995 and assigned to the assignee of the present application, discloses a food heating and sterilizing apparatus comprising a heating vessel (a heater) for sterilizing packages of food fed successively thereto at high temperature and under high pressure. In the disclosed apparatus, a heating chamber filled with hot and pressurized steam and a cooling chamber held to a temperature lower than that of the heating chamber are connected with each other by way of a sealing gate, which is opened at regular intervals to allow the food sterilized in the heating chamber to be advanced into the cooling chamber. With this arrangement, low temperature air can flow from the cooling chamber into the heating chamber whenever the sealing gate is opened to interfere with the conduction of heat to the food and consequently lower the efficiency with which the food is heated.

Additionally, steam in the heating chamber can be condensed to water to accumulate in the heating chamber due to the cold air flow from the cooling chamber. The water to be drained can boil up abruptly or bump (reboiling phenomenon occurs) when the sealing gate is opened and the inner pressure of the heating chamber is lowered, so that the food in the chamber is wetted and degraded.

SUMMARY OF THE INVENTION

In view of the above identified technological problems, it is therefore an object of the present invention to provide method and apparatus for heating and sterilizing food that can effectively heat and sterilize food.

It is another object of the invention to provide a method for heating and sterilizing food that can uniformly heat and sterilize solid food containing minute void spaces within a short period of time.

It is still another object of the invention to provide an apparatus for heating and sterilizing food that can heat and sterilize food without degrading it.

It is further object of the invention to provide a method and apparatus for heating and sterilizing food that can heat and sterilize food without discoloring the surface of the food and degrading the food through excessive heating.

According to the invention, the above objects and other objects can be achieved by providing a method and apparatus for heating and sterilizing food comprising steps of filling a container having an opening with solid food, moving the food into a sealable sterilizing chamber and applying straightly flowing steam to said solid food.

According to the invention, there is also provided an apparatus for heating and sterilizing food comprising a heating and sterilizing chamber for heating and sterilizing food under pressure higher than the atmospheric pressure, said food being contained in a container having an opening and being successively fed in, characterized in that said heating and sterilizing chamber is provided with a steam supply means for supplying steam and a drain means from draining away unnecessary fluid out of it.

According to the invention, there is also provided an apparatus for heating and sterilizing food comprising a food feeding section in communication with the atmosphere, a pressure upward regulating chamber, a heating and sterilizing chamber for heating and sterilizing food under pressure higher than the atmospheric pressure, a cooling chamber for cooling the heated and sterilized food, a pressure downward regulating chamber and a delivery section for discharging food arranged successively and connected by way of respective sealing gates, said food being contained in rigid containers having an opening and moved successively from said food feeding section to said heating and sterilizing chamber, said food feeding section, said heating and sterilizing chamber, said cooling chamber and said delivery section being arranged perpendicularly relative to or in parallel with each other and said food feeding section, said pressure upward regulating chamber, said heating and sterilizing chamber, said cooling chamber, said pressure downward regulating chamber and said delivery section being provided at respective upstream portions thereof with a pusher device for pushing downstream said rigid containers, each of pusher devices having a stroke equal to or greater than the width of a rigid container, and said apparatus further comprising steam supply means for supplying steam and a drain means for draining unnecessary fluid out of the heating and sterilizing chamber and said containers have an opening facing upward and being provided at the bottom thereof with a hole so sized as not to allow the food to pass therethrough, steam supplied from said steam supply means being straightly applied to the food in each container and thereafter flowing downward through the hole thereof.

DETAILED DESCRIPTION OF THE INVENTION

Figure 1:
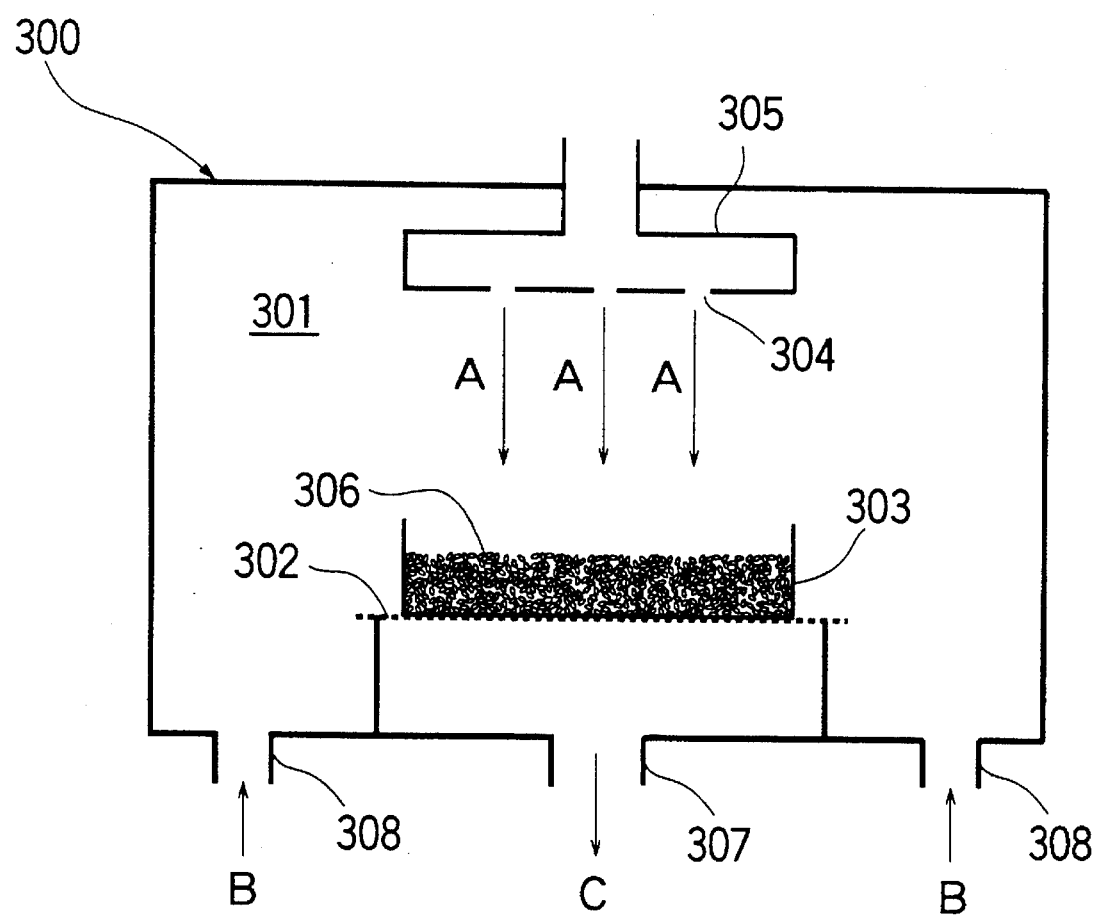
FIG. 1 is a schematic longitudinal cross sectional view of a first embodiment of apparatus for heating and sterilizing the food according to the invention.

Now, the invention will be described by referring to the accompanying drawings that illustrate preferred embodiments of the invention.

This invention is intended to heat and sterilize solid food that does not deteriorates if directly put into contact with hot and pressurized steam. Solid food items to which the present invention is applicable, include boiled rice, cooked rice such as pilaf, noodles such as "udon", "soba" and Chinese noodles, pasta such as macaroni and spaghetti, beans such as soy beans, peas such as green peas, vegetable such as potato, carrot and sorghum, meat such as beef and pork, and processed food such as meat balls, fried bean curd or fried "kamaboko". The present invention is particularly effective for food items having void spaces when contained in containers.

The first embodiment of food heating and sterilizing apparatus 300 is described below. This food heating and sterilizing apparatus 300 is an autoclave. It comprises a heating and sterilizing chamber 301 disposed within the apparatus and provided at a lower portion thereof with a shelf 302 having an upper plate, which is a meshy member. The upper plate of the shelf 302 carries thereon a cylindrical container 303 with a diameter of about 140 millimeters and a height of about 55 millimeters. The cylindrical container 303 is provided at the bottom thereof with holes (not shown) having diameters of about 2 millimeter and arranged at intervals of 3 millimeters. The heating and sterilizing chamber 301 is additionally provided at an upper portion thereof with a steam supply pipe 305 having a plurality of steam blow out ports 304. The steam supply pipe 305 is connected to a steam generating means (not shown) such as a boiler and supplies steam into the heating and sterilizing chamber 301. The steam blow out ports 304 are located substantially directly above the cylindrical container 303 placed on the shelf 302 so that steam blown out of the blow out ports 304 may directly and vertically hit the food 306 contained in the cylindrical container 303. The heating and sterilizing chamber 302 is further provided at a central position of the bottom opposite to the upper plate of said shelf with an exhaust port 307 and at peripheral positions of the bottom with steam supply ports 308.

Said container 303 is made of a thermally resistive material. Specific materials that can be used for the container include plastic materials, ceramic materials and metals, although the container is preferably a plastic container having no holes at the bottom if a closure is directly fitted thereto to produce a sealed product immediately after the sterilizing operation. While the container 303 may not necessarily be cylindrical, preferably it is tray-shaped or cup-shaped and has an opening having an area equal to or greater than that of the bottom so that the food in the container may be evenly exposed to steam. Furthermore, the food is preferably made very flat in the container so that it may be exposed to steam more uniformly.

While the embodiment of food heating and sterilizing apparatus 300 comprises a single shelf 302 and a single container 303 arranged on the shelf 302, a plurality of containers 303 may alternatively be arranged on the shelf 302 or, still alternatively, two or more shelves may be provided in the apparatus, each carrying thereon one or more containers 303.

While any appropriate number of blow out ports 304 may be arranged in the apparatus, the number of blow out ports 304 may preferably be made equal to the number of containers 303, if more than one container 303 is provided in the heating and sterilizing chamber 301, so that there is a one-to-one correspondence. A single blow out port 304 may operate efficiently for sterilization if a plurality of containers 303 are made to move within the heating and sterilizing chamber 301.

While the above embodiment of food heating and sterilizing apparatus 300 is provided with an exhaust port 307 disposed below the shelf 302, a steam blow out port may alternatively be arranged below the shelf 302 so that steam may hit the food in the container 303 from underneath the food.

Alternatively, a tall cylindrical container having a plurality of holes along the lateral wall thereof may be used and steam blow out ports may be arranged on the lateral wall of the autoclave so that steam may horizontally hit the lateral wall of the container. If such is the case, the efficiency of the sterilizing operation of the apparatus can be improved by arranging an exhaust port at a location opposite the blow out ports on the lateral wall of the autoclave. Still alternatively, a steam blow out port may be arranged below the container such that steam may hit the lateral wall of the autoclave having a horizontally disposed cylindrical form and an exhaust port may be arranged on the bottom of the autoclave at a position directly below the container. Then, consequently steam proceeds directly downward from above and vertically hits the food.

For the purpose of the invention, in the specification, "steam" includes saturated steam, a superheated steam and any other types of steam that can be used for heating and sterilizing food.

The above embodiment of food heating and sterilizing apparatus 300 will now be described by way of a number of Experimental Examples.

EXPERIMENTAL EXAMPLE 1

Figure 2:
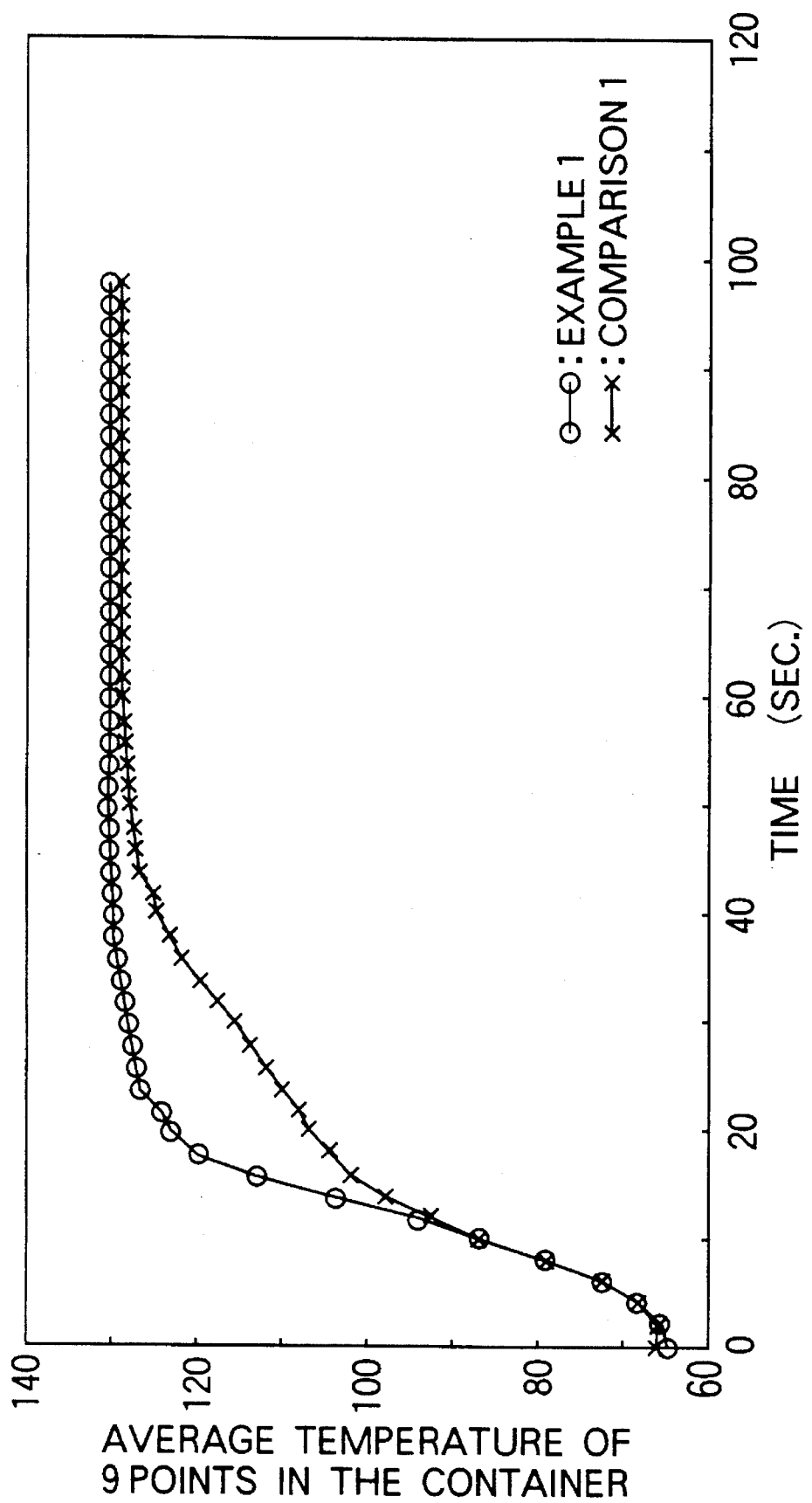
FIG. 2 is a graph showing some of the results of an experiment of sterilizing food obtained by using the apparatus of FIG. 1.

The container 303 containing food (boiled rice) 306 therein was placed on the shelf 302 and steam was fed into the sterilizing chamber 301 through the steam supply port 308. The supplied steam pressure was regulated to a level higher than the specified pressure of the sterilizing chamber 301 by 0.5 to 1.5 kg/cm². More specifically, steam was generated by a boiler (not shown) to a pressure level of 7 kg/cm², which was reduced to 3 kg/cm² by means of a pressure reducing valve (not shown), before it was fed into the sterilizing chamber 301 through the steam supply port 308. At this time, the exhaust port 307 was held open so that any air remaining in the sterilizing chamber 301 was forced out of the sterilizing chamber 301 through the exhaust port 307. When the sterilizing chamber 301 was filled with steam (or about 1 second later), both the exhaust port 307 and the steam supply port 308 were closed. Thereafter, steam was introduced into the sterilizing chamber 301 through the steam blow out port 304 until the temperature in the sterilizing chamber was raised to about 130° C. and held to that level until the $F_0$ value of the atmosphere in the sterilizing chamber 301 got to 10. After the start of the supply of steam, the temperature of the void gaps in the boiled rice 306 in the container 303 was observed at nine (9) points by means of thermocouples (not shown). FIG. 2 illustrates the average temperature rise observed in the experiment. This operation was repeated three times. Table 1 shows the average of the $F_0$ values observed in the void spaces of the boiled rice 306 and the deviation when the $F_0$ value of the atmosphere in the sterilizing chamber 301 was 10. Throughout this specification, the deviation is defined as the difference between the maximum and minimum values at each point of observation.

Steam was made to blow downward from the steam blow out port 304 and hit the food vertically. The steam that had hit the food vertically then passed through the void spaces in the lump of the boiled rice and drove out the air contained in the spaces. Thus, the food was made to directly contact with steam even at the center of the lump so that the inside temperature of the lump of the food smoothly and uniformly rose with the temperature in the remaining parts of the food. Consequently, the food was not discolored nor deteriorated by superheating and any defective sterilization of the rice due to insufficient heating was avoided.

COMPARATIVE EXAMPLE 1

The container 303 containing boiled rice 306 therein was placed on the shelf 302 and steam was supplied into the sterilizing chamber 301 through the steam supply port 308 until any remaining air was forced out through the exhaust port 307 and the sterilizing chamber 301 was filled with steam. At this time (or about 10 seconds later), the exhaust port 307 was closed. The supply of steam of was continued thereafter until the inside temperature of the sterilizing chamber rose to about 130° C., which temperature was then maintained.

Under this condition, the temperature of the void gaps in the boiled rice 306 in the container 303 was observed at nine (9) points by means of thermocouples (not shown). FIG. 2 illustrates the average temperature rise observed in the experiment. This operation was repeated for three times. Table 1 shows the average of the $F_0$ values observed in the void spaces of the cooked rise 306 and the deviation when the $F_0$ value of the atmosphere in the sterilizing chamber 301 was 10.

TABLE 1

|  | $F_0$ value in spaces of rice when $F_0$ in the atmosphere was 10 | | | | | | | | | average value | deviation |
|---|---|---|---|---|---|---|---|---|---|---|---|
| Experimental Example 1 | 9.51 | 9.44 | 9.52 | 9.37 | 9.42 | 9.63 | 9.63 | 9.65 | 9.83 | | |
|  | 9.50 | 9.63 | 9.56 | 9.51 | 9.32 | 9.10 | 9.47 | 9.13 | 9.59 | 9.74 | 0.73 |
|  | 9.61 | 9.22 | 9.19 | 9.13 | 9.31 | 9.36 | 9.81 | 9.59 | 9.62 | | |
| Comparative Example 1 | 4.32 | 7.18 | 7.98 | 7.56 | 4.76 | 3.49 | 6.12 | 7.92 | 8.11 | | |
|  | 6.05 | 7.33 | 4.59 | 6.16 | 6.96 | 6.26 | 4.19 | 4.25 | 8.01 | 6.28 | 5.18 |
|  | 8.67 | 4.28 | 4.89 | 5.91 | 5.09 | 7.91 | 6.94 | 6.97 | 7.56 | | |

As seen from FIG. 2 showing the curves representing the temperature rise observed at nine points in void spaces of the boiled rice, the temperature in void spaces rose more smoothly in Experimental Example 1 than in Comparative Example 1. Table 1 shows that the $F_0$ values at the observation points are substantially equal to each other in Experimental Example 1, whereas they substantially vary in Comparative Example 1.

EXPERIMENTAL EXAMPLE 2

This example is same as Experimental Example 1 except that the container did not have any hole at the bottom and the exhaust port 307 was kept open after the start of supplying steam through the steam blow out port 304.

Figure 3:
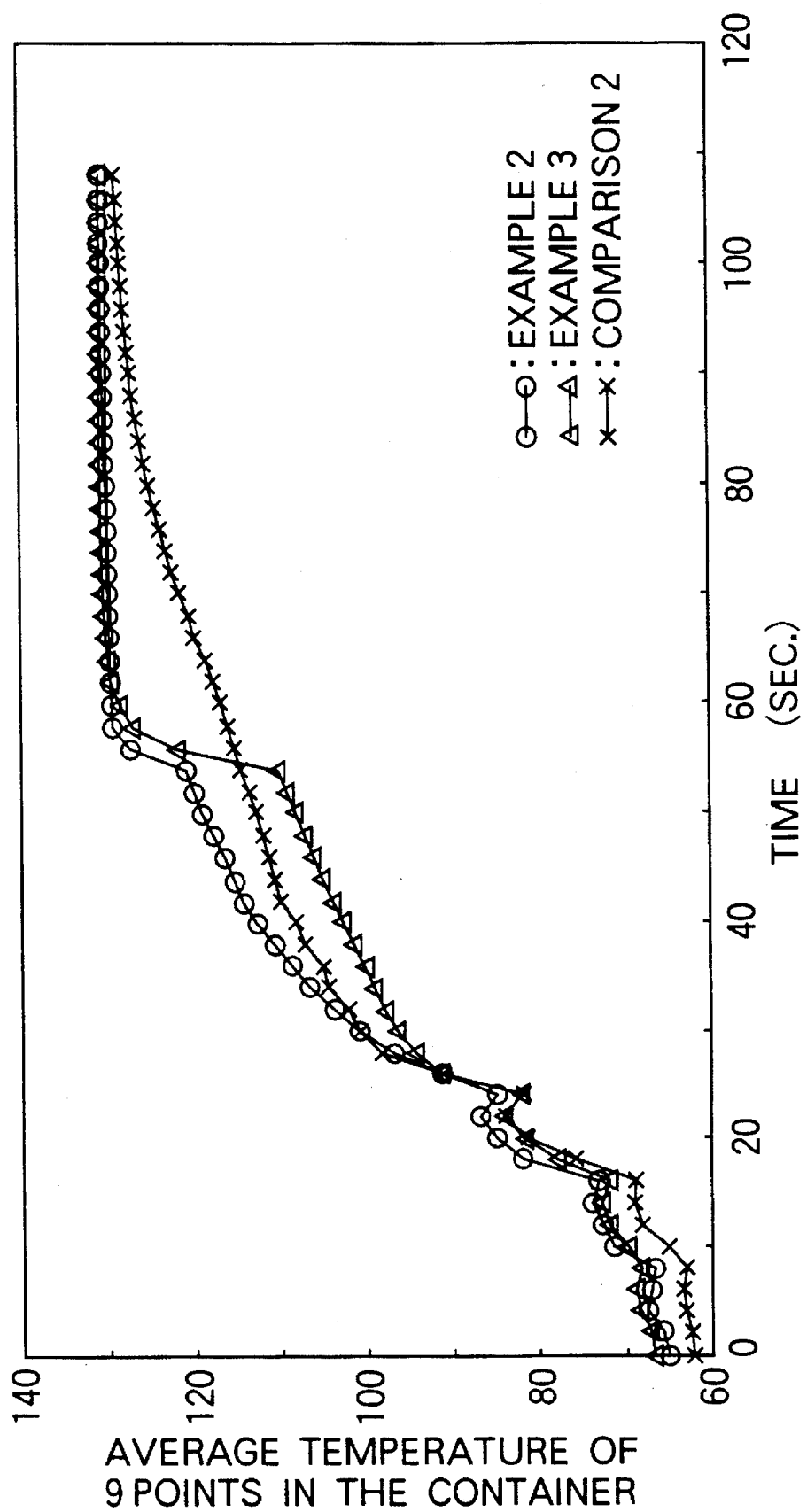
FIG. 3 is a graph showing some of the results of other experiments of sterilizing food obtained by using the apparatus of FIG. 1.

FIG. 3 illustrates the average temperature rise observed in void spaces in the experiment after the start of supplying vapor. This operation was repeated three times. Table 2 shows the average of the $F_0$ values observed in the void spaces of the cooked rise 306 and the deviation when the $F_0$ value of the atmosphere in the sterilizing chamber 301 was 10.

EXPERIMENTAL EXAMPLE 3

This example is same as Experimental Example 2 except that the exhaust port 307 was closed at the start of supplying steam through the vapor blow out port 304.

FIG. 3 illustrates the average temperature rise observed in void spaces in the experiment after the start of supplying vapor. Table 2 shows the average of the $F_0$ values observed in the void spaces of the cooked rice 306 and the deviation when the $F_0$ value of the atmosphere in the sterilizing chamber 301 was 10.

COMPARATIVE EXAMPLE 2

This comparative example is same as Comparative Example 1 except that the container did not have a hole at this bottom.

FIG. 3 illustrates the average temperature rise observed in void spaces in the experiment after the start of supplying vapor. This operation was repeated three times. Table 2 shows the average of the $F_0$ values observed in the void spaces of the cooked rice 306 and the deviation when the $F_0$ value of the atmosphere in the sterilizing chamber 301 was 10.

TABLE 2

| | $F_0$ value in spaces of rice when $F_0$ in the atmosphere was 10 | | | | | | | | average value | deviation |
|---|---|---|---|---|---|---|---|---|---|---|
| Experimental | 7.18 | 8.90 | 8.54 | 9.30 | 9.38 | 9.43 | 9.30 | 7.28 | 8.11 | |
| Example 2 | 7.23 | 9.01 | 6.98 | 9.25 | 9.09 | 9.32 | 7.99 | 7.67 | 9.11 | 8.37 | 2.67 |
| | 7.09 | 8.08 | 6.95 | 9.59 | 9.62 | 7.55 | 9.37 | 7.23 | 7.60 | |
| Example 3 | 6.86 | 6.28 | 6.37 | 9.22 | 8.99 | 6.50 | 8.28 | 7.09 | 6.98 | 7.40 | 2.94 |
| Comparative Example 2 | 0.61 | 7.08 | 1.06 | 9.06 | 7.03 | 8.71 | 3.83 | 0.22 | 1.72 | 4.37 | 8.84 |

As seen from FIG. 3 showing the curves representing the average temperature rise observed at nine points in void spaces of the boiled rice, the temperature in void spaces rose more smoothly in Experimental Examples 2 and 3 than in Comparative Example 2. Table 2 shows that the deviations in Experimental Examples 2 and 3 are smaller that that in Comparative Example 2.

Now, a second embodiment will be described by referring to FIGS. 4 through 10, where the food sterilizing apparatus is generally denoted by reference numeral 100.

Figure 5:
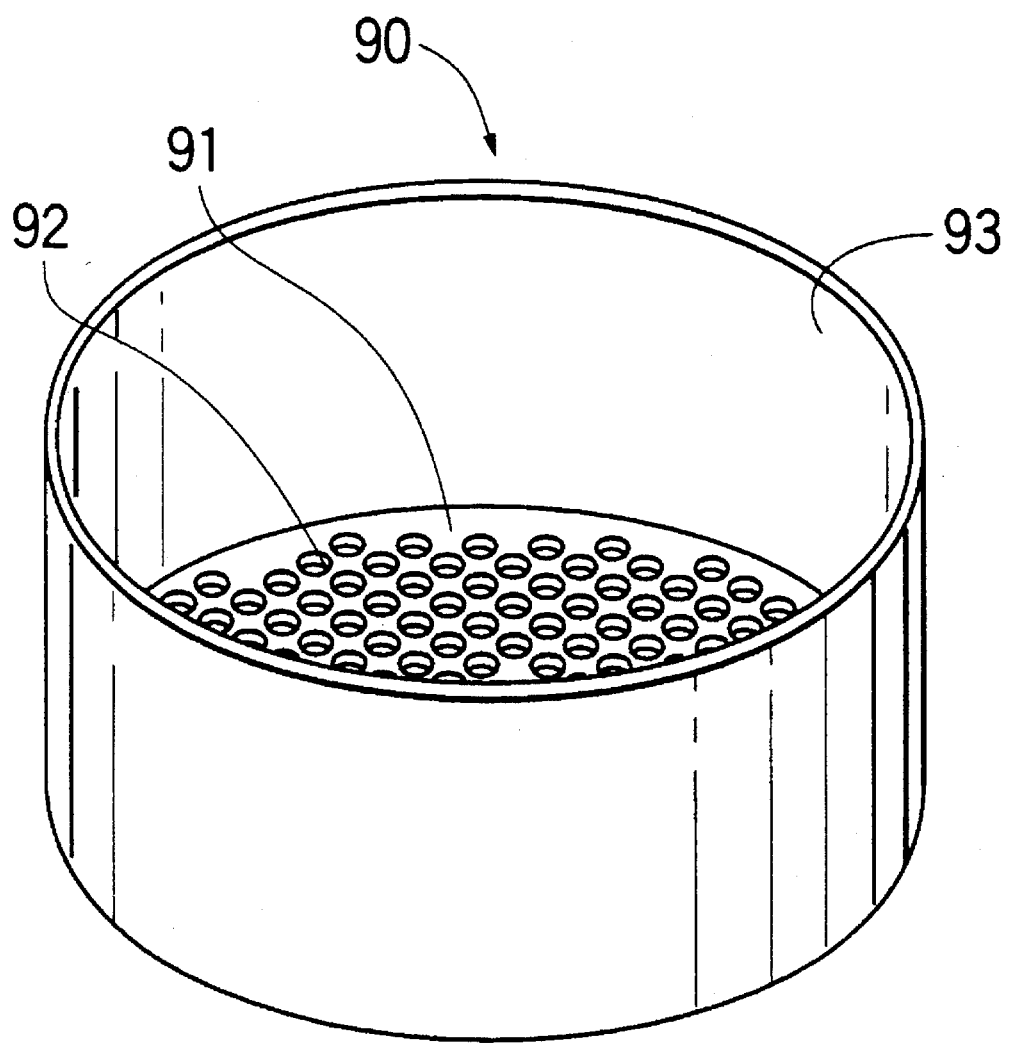
FIG. 5 is a schematic perspective view of a tray for containing food that can be used for the second and third embodiments of the apparatus for heating and sterilizing food according to the invention.

The food sterilizing apparatus 100 of this embodiment is designed to heat and sterilize solid food to be packed in retort pouches at a later stage, such as boiled rice, cooked noodles, the solid ingredients of stew or curry (e.g., vegetables) contained in rigid trays 90 or other containers. FIG. 5 schematically illustrates a tray adapted for use in the embodiment. The tray 90 is hollow and cylindrical and typically made of metal such as stainless steel. It has an open top 93 and a closed bottom and is designed to carry a predetermined volume of food (e.g., one portion of boiled rice). As a plurality of trays 90 successively pass through the food sterilizing apparatus 100, the food in the trays is heated and sterilized.

The bottom plate 91 of the tray 90 is provided with a number of small through bores 92 distributed over the entire area of the bottom plate 91. The size of the through bores 92 is selected that so the food placed on the bottom plate 92 of the tray 90 may not fall therethrough. Steam or other heating and sterilizing fluid may freely pass the bottom plate through the small through bores 92 to get to the entire surface of the food on the bottom plate 91.

Figure 4:
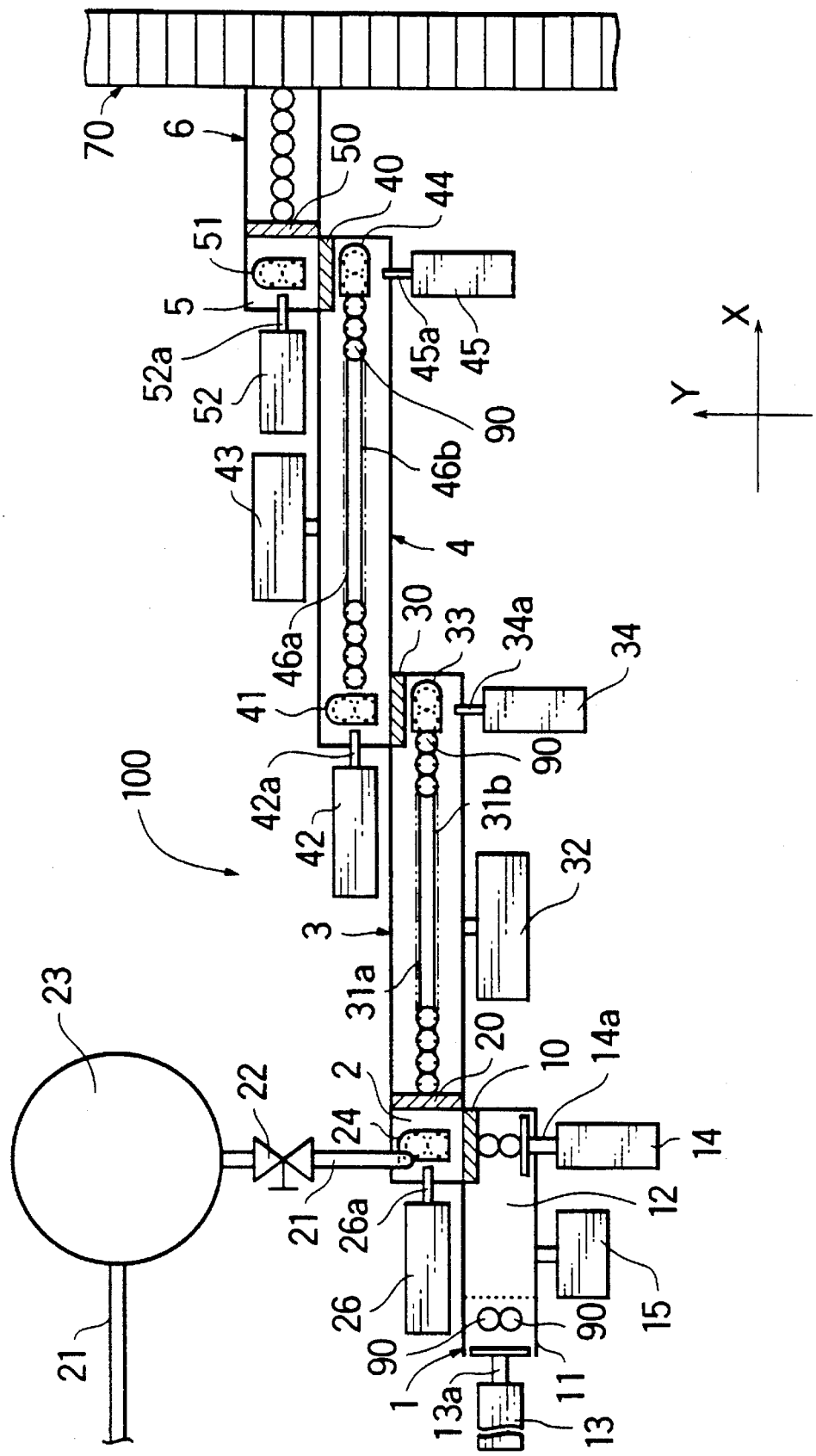
FIG. 4 is a schematic plan view of a second embodiment of the apparatus for heating and sterilizing food according to the invention, showing its overall configuration.

The main body of the food sterilizing apparatus 100 has a configuration as described below. Referring to FIG. 4, the food sterilizing apparatus 100 comprises, from the upstream end thereof, a food feeding section 1 held in communication with the atmosphere and designed to receive trays 90 containing food for sterilization, a heating and sterilizing chamber 3 for heating and sterilizing food under pressure higher than the atmospheric pressure, a cooling chamber 4 for cooling the heated and sterilized food and a delivery section 6 for discharging the cooled food out of the food sterilizing apparatus 100.

The food feeding section 1 by turn comprises a receiving section 11 located at the upstream extremity of the apparatus in order to receive food containing trays 90 and a preheating chamber 12 located downstream relative to the receiving section 11 in order to preheat the food in the trays 90 under the atmospheric pressure. A pressure upward regulating chamber 2 is disposed upstream relative to the heating and sterilizing chamber 3 and separated therefrom by a second gate valve 20, whereas a pressure downward regulating chamber 5 is disposed upstream relative to the delivery section 6 and separated therefrom by a fifth gate valve 50.

The preheating chamber 12 located in a downstream area of the food feeding section is connected to the pressure upward regulating chamber 2 located in an upstream area of the heating and sterilizing chamber 3 by way of a first gate valve 10. The heating and sterilizing chamber 3 is connected at a downstream portion thereof with an upstream area of the cooling chamber 4 via a third gate valve 30. The cooling chamber 4 is connected at a downstream portion thereof with the pressure downward regulating chamber 5 located upstream relative to the delivery section 6. Thus, trays 90 introduced into the food sterilizing apparatus 100 through the receiving section 11 of the food feeding section 1 are moved by pusher devices 13, 14, 26, 34, 42, 45 and 52 to the delivery section 6 by way of the preheating chamber 12, the pressure upward regulating chamber 2, the heating and sterilizing chamber 3, the cooling chamber 4 and the pressure downward regulating chamber 5.

A pair of received trays 90, 90 containing food to be sterilized are placed in juxtaposition in the receiving section 11 of the food feeding section 1 by a feeding means (not shown). The receiving section 11 is provided at an upstream portion thereof with a first pusher device 13 for moving downstream (in direction X) the paired trays 90, 90. The first pusher device 13 is provided with a T-shaped extendible pusher rod 13a, which pusher rod 13a is extendible and has a stroke that enables it to push the juxaposed trays 90, 90 downstream (in direction X) in the food feeding section 1 to the downstream end of the preheating chamber 12.

The preheating chamber 12 is provided outside the downstream end thereof with a second pusher device 14. More specifically, the second pusher device 14 is arranged opposite the pressure upward regulating chamber 2 with the downstream end of the preheating chamber 12 disposed therebetween. Like the first pusher device 13, the second pusher device 14 is provided with a T-shaped extendible pusher rod 14a, that is extendible in a direction (in direction Y) perpendicular to the general direction of movement of trays 90, 90 toward the pressure upward regulating chamber 2. The rod 14a has a stroke that enables it so go into the downstream end of the preheating chamber 12 and push the juxtaposed trays 90, 90 that arrive at the downstream end of the preheating chamber 12 under the pushing effect of the first pusher device 13 in a single row along the direction Y onto a turn table 24 arranged in the pressure upward regulating chamber 2.

The preheating chamber 12 is open to the atmosphere and therefore held under the atmospheric pressure and has a shape and dimensions adapted to guide a pair of juxtaposed trays 90, 90 downstream. The preheating chamber 12 is additionally provided with a preheating means 15 as schematically illustrated in FIG. 4. The preheating means 15 supplies the preheating chamber 12 with steam, while deaerating the preheating chamber 12.

The pressure upward regulating chamber 2 is connected at an upper portion thereof with a steam supply pipe 21 for feeding steam. The steam supply pipe 21 is by turn connected to a steam supply source (not shown) by way of a control valve 22 and a steam tank (pressurized fluid tank) for storing steam. As steam is generated in the steam supply source and fed to the pressure upward regulating chamber 2 by way of the steam supply pipe 21, the inner pressure and the temperature of the pressure upward regulating chamber 2 can be raised to the respective levels of the inner pressure and the temperature of the heating and sterilizing chamber 3. The steam tank 23 is designed to temporarily store steam from the steam supply source and preferably has a capacity 5 to 50 times, more preferably 10 to 30 times greater than the capacity of the pressure upward regulating chamber 2. The pressure of steam in the steam tank 23 is preferably between 0.5 and 3.0 kg/cm$^2$ and more preferably between 1.0 and 2.5 kg/cm$^2$ (as observed by a pressure gauge). The control valve 22 is designed to control the supply of steam to the pressure upward regulating chamber 2 by its ON/OFF action realized under the control of a control device (not shown).

Figure 6:
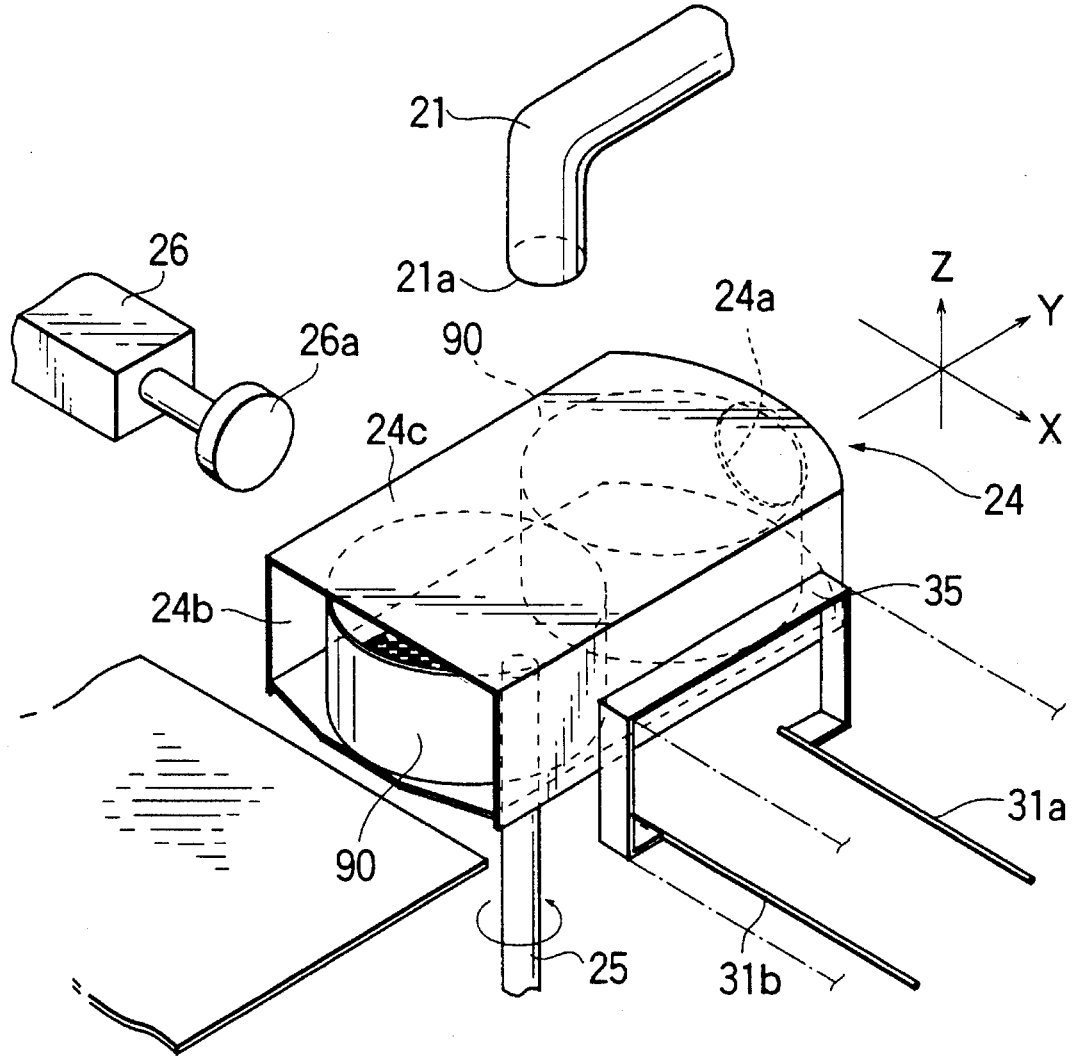
FIG. 6 is a schematic perspective view of the turn table arranged in the pressure upward regulating chamber of the second embodiment of the apparatus heating and sterilizing food according to the invention, showing the turn table placed in a first position.
Figure 7:
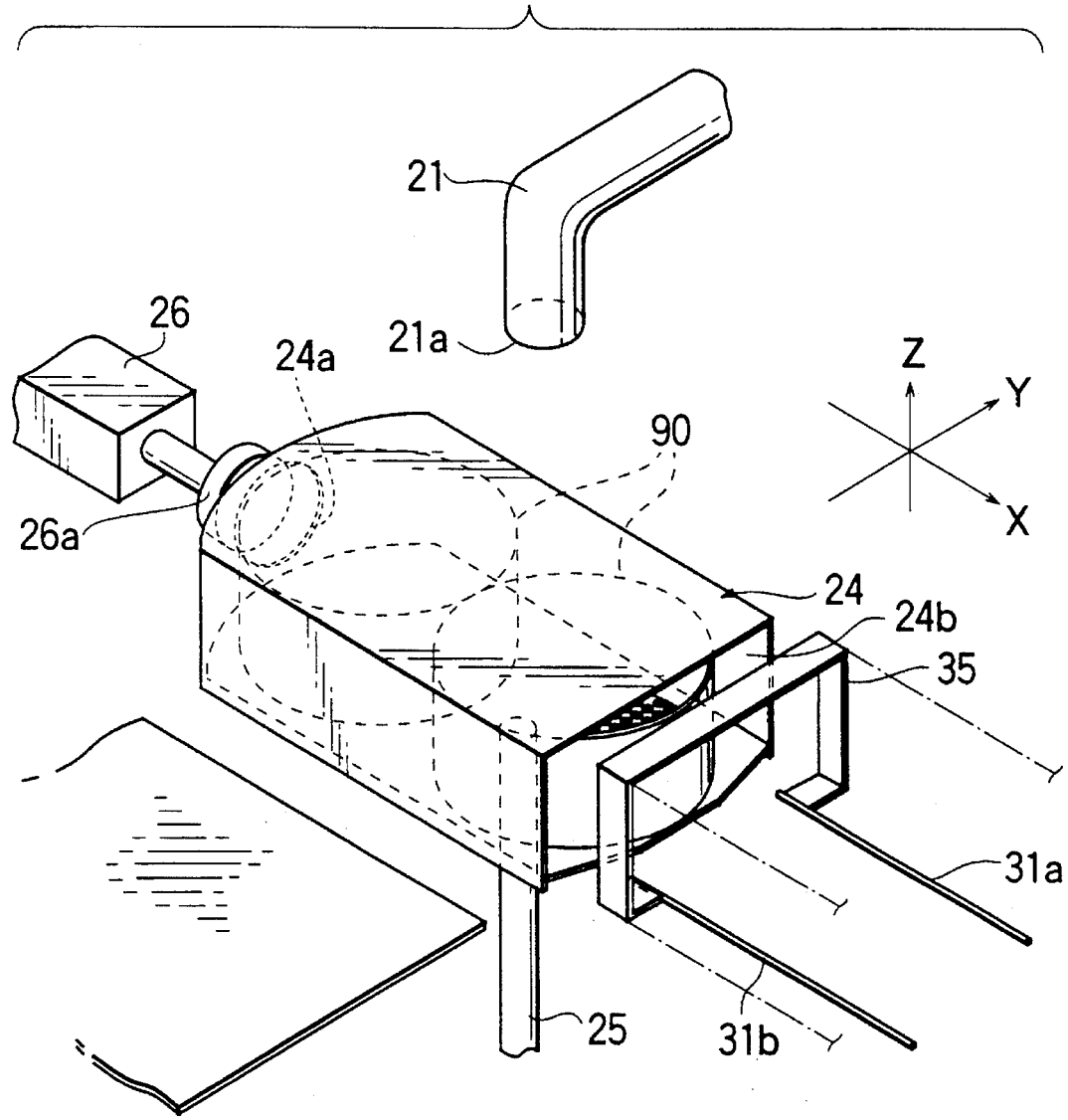
FIG. 7 is a schematic perspective view of the turn table arranged in the pressure upward regulating chamber of the second embodiment of the apparatus for heating and sterilizing food according to the invention, showing the turn table placed in a second position.
Figure 8:
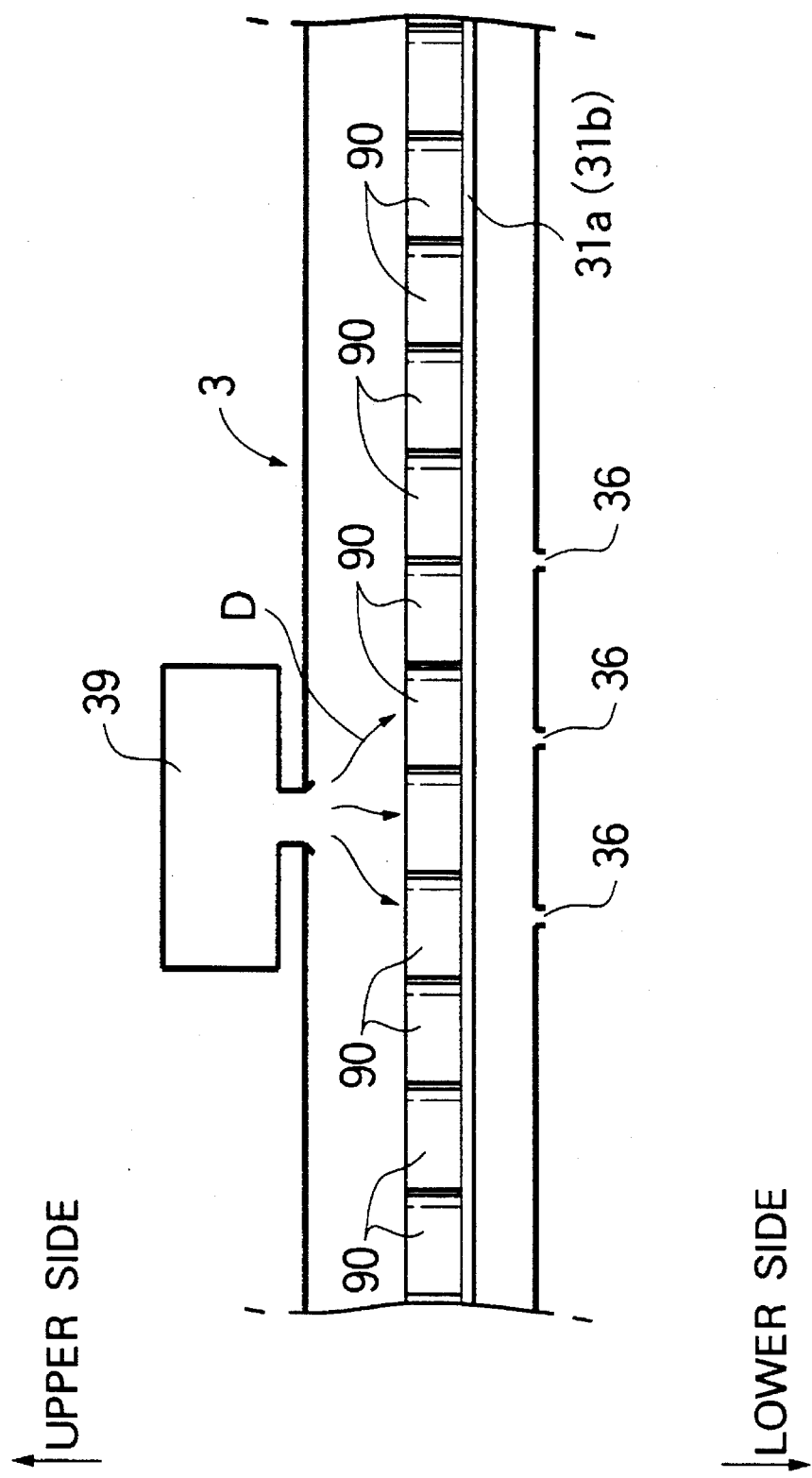
FIG. 8 is a schematic partial longitudinal cross sectional view of the heating and sterilizing chamber of the second embodiment of the apparatus for heating and sterilizing food according to the invention, showing the heating and sterilizing means.

A turn table 24 is arranged within the pressure upward regulating chamber and rotatable around a vertical axis Z (See FIGS. 6 and 7). The turn table 24 itself is a substantially rectangularly parallelepipedic cabinet-like hollow body which is open at a longitudinal smaller lateral side and dimensioned so as to contain a pair of trays in a row. Thus, a pair of trays 90, 90 can move into and out of the turn table 24 through the open side (open area 24b). A substantially circular hole 24a is cut through the lateral wall opposite to the open side of the turn table 24.

The top plate 24c of the turn table 24 covers the open tops of the trays 90, 90 housed in the turn table 24. More specifically, the top plate 24c is located between the open end 21a of the steam supply pipe 21 in the pressure upward regulating chamber 2 and the open tops 93, 93 of the trays 90, 90 housed in the turn table 24 so that it effectively prevents steam blown out of the open end 21a of the pipe 21 from directly entering the trays 90, 90 through the open tops 93, 93.

The turn table 24 is provided at the bottom thereof with a rotary shaft 25 so that it may rotate around said rotary shaft 25 by a predetermined angle. More specifically, the turn table 24 rotates by 90° between a first position where the open side area 24b faces the preheating chamber 12 and a second position where the open side area 24b faces the heating and sterilizing chamber 3 (FIGS. 6 and 7). In the first position of the turn table 24, a pair of trays 90, 90 can be housed in the turn table 24 as they are pushed forward toward the pressure upward regulating chamber 2 (in direction Y) by the second pusher device 14, whereas, in the second position, the pair of trays 90, 90 housed in the turn table 24 can be pushed into the heating and sterilizing chamber 3 from the turn table 24 through the open side area 24b thereof by a third pusher device 26, which will be described hereinafter.

Outside the pressure upward regulating chamber 2 and at the side thereof disposed opposite to the heating and sterilizing chamber 3, there is provided a third pusher device 26 for pushing out a pair of trays 90, 90 housed in the turn table 24 into the heating and sterilizing chamber 3 when the turn table 24 is disposed in its second position as shown in FIG. 7. The third pusher device 26 is provided with an extendible pusher rod 26a, which is so shaped and dimensioned that it can move through the hole 24a cut through a wall of the turn table 24. The extendible pusher rod 26a has a stroke long enough to push out a pair of trays 90, 90 housed in the turn table 24 and arranged in a row as shown in FIG. 7 into the heating and sterilizing chamber 3.

The heating and sterilizing chamber 3 is located downstream relative to the pressure upward regulating chamber 2 and has a substantially cylindrical and oblong inner space, where a pair of rails 31a and 31b are arranged in parallel with a given distance separating them from each other and extend longitudinally over the entire length of the chamber. The pair of trays 90, 90 pushed out of the pressure upward regulating chamber 2 and forced into the heating and sterilizing chamber 3 by the third pusher device 26 are then moved downstream on the rails 31a and 31b, the distance separating the rails 31a and 31b being so selected for them to appropriately support the bottoms of the traveling trays 90, 90. The rails 31a and 31b are provided with a number of guide members 35 arranged with a predetermined distance separating any adjacent ones so that the trays 90, 90 can safely and smoothly advance along the rails 31a and 31b as shown in FIGS. 6 and 7. In short, the rails 31a and 31b and the guide members 35 constitute a tray transfer route for advancing trays into the heating and sterilizing chamber 3 in a row.

The heating and sterilizing chamber 3 is provided with a heating and sterilizing means 32 for maintaining the inner pressure and the temperature of the heating and sterilizing chamber 3 to predetermined levels. The heating and sterilizing means 32, which is schematically illustrated in FIG. 4, comprises a steam supply means 39 for feeding steam into the heating and sterilizing chamber 3 and an exhaust means 36 for drawing unnecessary fluid out of the heating and sterilizing chamber 3 (See FIG. 8). The steam supply means 39 is connected to an upper portion of the heating and sterilizing chamber 3 and designed to apply steam to the trays 90, 90 traveling on the rails 31a, 31a from above. On the other hand, the exhaust means is in fact an exhaust port 36 arranged at the bottom of the heating and sterilizing chamber 3. The exhaust port 36 may be provided with a check valve.

The steam supply means 39 supplies steam with pressure higher than the predetermined inner pressure of the heating and sterilizing chamber 3 by 0.05 to 0.3 kg/cm$^2$. The exhaust means 36 at the bottom of the heating and sterilizing chamber operates to draw unnecessary fluid such as air containing steam and drain water out of the heating and sterilizing chamber and, at the same time, maintains the internal pressure of the heating and sterilizing chamber to a predetermined level.

Steam coming from the steam supply means 39 and immediately before entering the heating and sterilizing chamber preferably shows a pressure level higher than the predetermined internal pressure level of the heating and sterilizing chamber by 0.05–0.3 kg/cm$^2$, more preferably by 0.1–0.2 kg/cm$^2$. If the pressure difference is smaller than 0.05 kg/cm$^2$, the pressure of the entering steam is not sufficiently high for controlling the internal pressure of the heating and sterilizing chamber and the exhaust means 36 does not operate satisfactorily. If, on the other hand, the pressure difference is greater than 0.3 kg/cm$^2$, steam may flow violently to raise the temperature of the steam supply means 39 at the opening thereof and deteriorate the food.

In this embodiment, the inner pressure and the temperature of the heating and sterilizing chamber 3 are preferably held to 0.45–2.65 kg/cm$^2$, preferably to 1.00–2.15 kg/cm$^2$ (as observed with a gauge), and 120°–135° C. respectively.

The heating and sterilizing chamber 3 is provided at the downstream and thereof with a turn table 33 similar to the one arranged in the pressure upward regulating chamber 2. The heating and sterilizing chamber 3 is additionally provided outside and at the side thereof disposed opposite to the cooling chamber 4 with a fourth pusher device 34 similar to the third pusher device 26. The turn table 33 and the pusher device 34 operate like the turn table 24 and the third pusher device 26 respectively. As described above, the heating and sterilizing chamber 3 is connected at the downstream end thereof to the upstream end of the cooling chamber 4 arranged in parallel with the heating and sterilizing chamber 3 by way of the third gate valve 30.

The cooling chamber 4 is provided at the upstream end thereof with a turn table 41 similar to the one arranged in the pressure upward regulating chamber 2. The cooling chamber 4 is additionally provided near the upstream end thereof with a fifth pusher device 42 similar to the third pusher device 26. The turn table 41 and the pusher device 42 operate like the turn table 24 and the third pusher device 26 respectively.

The cooling chamber 4 has a configuration similar to that of the heating and sterilizing chamber 3. It has a substantially cylindrical and oblong inner space, where a pair of rails 46a and 46b are arranged in parallel with a given distance separating them from each other and extend longitudinally over the entire length of the chamber. The pair of trays carried in a row by the turn table 41 are advanced downstream on the rails 46a and 46b, the distance separating the rails 46a and 46b being so selected for them to appropriately support the bottoms of the traveling trays 90, 90. The rails 46a and 46b are provided with a number of guide members similar to the guide members 35 described above and arranged with a predetermined distance separating any adjacent ones so that the trays 90, 90 can safely and smoothly advance along the rails 46a and 46b.

The cooling chamber 4 is provided with a cooling means 43 for maintaining the inner pressure and the temperature of the cooling chamber 4 to predetermined respective levels. The cooling means 43, which is schematically illustrated in FIG. 4, feed air at 80° C. to the cooling chamber 4 to maintain the inner pressure and the temperature of the cooling chamber 4 typically to 1.8 kg/cm$^2$ and 80° C. respectively.

The cooling chamber 4 is provided at the downstream end thereof with a turn table 44 similar to the one arranged in the pressure upward regulating chamber 2. The cooling chamber 4 is additionally provided near the downstream end thereof with a sixth pusher device 45 similar to the third pusher device 26. The turn table 44 and the sixth pusher device 45 operate like the turn table 24 and the third pusher device 26 respectively.

The pressure downward regulating chamber 5 is arranged in parallel with and connected to the downstream end of the cooling chamber 4 by way of a gate valve 40 and has a configuration similar to that of the pressure upward regulating chamber 2. More specifically, it is provided with a turn table 51 for receiving a pair of trays 90, 90 arranged in a row and coming from the cooling chamber 4 and a seventh pusher device 52 for moving the trays 90, 90 housed in the turn table 51 in a row into the delivery section 6. The pressure downward regulating chamber 5 differs from the pressure upward regulating chamber 2 in that the steam supply pipe 21 of the latter is replaced by an air supply pipe (not shown).

The delivery section 6 is provided at the downstream side thereof with a conveying means such as a belt conveyor. The sterilized food that has been moved to the delivery section in trays 90 is then sent to a packaging station (not shown). Note that the delivery section 6, the conveying means 70 and the packaging station are housed in a clean room. At the packaging station, the food is taken out of the trays 90 and packed in sterilized containers which are packages for the finishing products, the containers are then airtightly sealed after, if necessary, having been filled with sterilized liquid food.

For the purpose of the invention, the term "steam" includes saturated steam, super heated steam and other vapors used for heating and sterilizing the food.

The above described food sterilizing apparatus 100 operates in a manner as described below.

The food contained in trays supplied by a supply means (not shown) are received by the receiving section 11 of the food feeding section 1 such that a pair of juxtaposed trays 90, 90 are arranged in the receiving section 11 at a time. Then the first pusher device 13 is operated to move the juxtaposed trays 90, 90 to the downstream end of the preheating chamber 12 by means of the pusher rod 13a. Since steam is supplied to the inside of the preheating chamber 12 by the steam supply means 15, the air that fills the gaps in the food housed in the trays 90, 90 is replaced by steam to preheat the food while the food is traveling forward in the preheating chamber 12.

Then, the first gate valve 10 is opened to make the pressure upward regulating chamber 2 communicate with the preheating chamber 12, while the second gate valve 20 is kept closed, and the turn table 24 is put to its first position as shown in FIGS. 4 and 6. Then, the pusher rod 14a of the second pusher device 14 is extended to push the trays 90, 90 arranged in juxtaposition at the downstream end of the preheating chamber 12 into the turn table 24 in a row running along the pressure upward regulating chamber 2. Thereafter, the pusher rod 14*a* is contracted and the turn table 24 is rotated counterclockwise by 90° to its second position as illustrated in FIG. 7. Simultaneously or subsequently, the first gate valve 10 is shut to bring the pressure upward regulating chamber 2 into a closed state and then the control valve 22 is opened to allow steam to flow into the pressure upward regulating chamber 2 from the tank 23 until the inner pressure of the pressure upward regulating chamber becomes equal to that of the heating and sterilizing chamber 3. Since the top plate 24*c* of the turn table 24 covers the openings 93, 93 of the trays 90, 90, steam bursting out of the open end 21*a* of the pipe 21 would not directly hit the food in the trays 90, 90 and blow it away.

Then, the second gate valve 20 is opened and the third pusher device 26 is operated to extend the pusher rod 26*a*, which by turn pushes the trays 90, 90 in the turn table 24 into the tray transfer route in the heating and sterilizing chamber 3. Since the heating and sterilizing chamber 3 is already filled with trays on the transfer route as a result of preceding cycles, the frontmost pair of trays on the transfer route are pushed into the turn table 33 by the newly arrived pair of trays 90, 90 that are pushed onto the transfer route. The open lateral side of the turn table 33 is directed to the transfer route of the heating and sterilizing chamber 3 to receive the pair of trays 90, 90 pushed out of the heating and sterilizing chamber 3. Thereafter, the turn table 33 is rotated clockwise by 90° and the third gate valve 30 is opened, while the fourth pusher device 34 is operated to extend the pusher rod 34*a* and push the trays 90, 90 in the turn table 33 toward the cooling chamber 4 until the trays are put into the turn table 41 having its open lateral side directed to the fourth pusher device 34.

Note that, once the trays 90, 90 are pushed out of the pressure upward regulating chamber 2, the second gate valve 20 is closed immediately and the inner pressure of the pressure upward regulating chamber 2 is reduced to the level of the atmospheric pressure by a pressure reducing means (not shown) such as a valve. Then, the first gate valve 10 is opened and the succeeding pair of trays 90, 90 are moved into the pressure upward regulating chamber 2.

In the heating and sterilizing chamber 3, steam coming from the steam supply means 39 hits the row of trays 90 traveling on the rails 31*a*, 31*b* from above. More specifically, steam hits the trays 90 from above substantially vertically as shown by arrow D in FIG. 8 and then runs out of the trays through the holes arranged at the bottom thereof. Thereafter, the steam passes through the exhaust port 36 arranged at the bottom of the heating and sterilizing chamber 3 and goes out of the chamber 3. Note that any drain water produced in the heating and sterilizing chamber 3 and air coming from the cooling chamber are also forced out of the chamber by the flow of steam.

Then, the third gate valve 30 is closed and the turn table 41 is rotated counterclockwise by 90° until the open lateral side of the turn table 41 is directed to the transfer route of the cooling chamber 4. Subsequently, the fifth pusher device 42 is operated to extend the pusher rod 42*a* and push the pair of trays 90, 90 on the turn table 41 onto the transfer route in the cooling chamber 4. Since the cooling chamber 4 is already filled with trays on the transfer route as a result of preceding cycles, the frontmost pair of trays on the transfer route are pushed into the turn table 44 having its open lateral side directed to the transfer route by the newly arrived pair of trays 90, 90 that are pushed onto the transfer route by the fifth pusher device 42 as in the case of the heating and sterilizing chamber 3.

Now, the turn table 44 is rotated clockwise by 90°. Then, the fifth gate valve 50 is closed and, while keeping the open lateral side of the turn table 51 directed to the cooling chamber 4 (as shown in FIG. 1), air is suppled to the pressure downward regulating chamber 5 from the air supply pipe until the inner pressure of the pressure downward regulating chamber 5 gets to the level of that of the cooling chamber 4. Then, the fourth gate valve 40 is opened to make the pressure downward regulating chamber 5 communicate with the cooling chamber 4 and the sixth pusher device 45 is operated to extend the pusher rod 45*a* and push the trays 90, 90 housed in the turn table 44 in a row into the turn table 51.

Thereafter, the pusher rod 45*a* of the sixth pusher device 45 is contracted to its original state and the turn table 51 is rotated counterclockwise by 90° so that its open lateral side of the turn table is directed to the delivery section 6. Simultaneously or subsequently, the fourth gate valve 40 is shut to bring the pressure downward regulating chamber 5 into a closed state and then the pressure reducing means (not shown) such as a valve is opened to allow the inner pressure of the pressure downward regulating chamber 5 to fall to the level of the atmospheric pressure.

Then, the fifth gate valve 50 is opened and the seventh pusher device 52 is operated to extend the pusher rod 52*a* and push the trays 90, 90 housed in the turn table 51 in a row into the delivery section 6.

The trays 90, 90 moved into the delivery section 6 are then transferred to a subsequent station (not shown) for packaging by means of the belt conveyor 70.

A series of experiments were conducted to sterilize food by means of the above embodiment of food heating and sterilizing apparatus 100. In Experimental Example 4, the internal pressure of the heating and sterilizing chamber 3 was held to 1.75 kg/cm$^2$ and steam under pressure of 1.80 kg/cm$^2$ was supplied to the inside of the heating and sterilizing chamber 3 by the steam supply means 39. Rigid trays, each containing a 200 g of boiled rice were treated for sterilization at a rate of 10 trays per minute.

In Experimental Example 5, the internal pressure of the heating and sterilizing chamber 3 was held to 1.75 kg/cm$^2$ and steam under pressure of 1.90 kg/cm$^2$ was supplied to the inside of the heating and sterilizing chamber 3. Otherwise, this experiment was carried out in a manner same as the experiment in Experimental Example 4.

In Experimental Example 6, the internal pressure of the heating and sterilizing chamber 3 was held to 1.75 kg/cm$^2$ and steam under pressure of 2.05 kg/cm$^2$ was supplied to the inside of the heating and sterilizing chamber 3. Otherwise, this experiment was carried out in a manner same as the experiment in Experimental Example 4.

In Comparative Example 3, the exhaust port at the bottom of the heating and sterilizing chamber 3 was closed and the internal pressure of the heating and sterilizing chamber 3 was held to 1.75 kg/cm$^2$ and steam was supplied from above into the heating and sterilizing chamber 3 as in the case of Experimental Example 4.

When the bottom of the heating and sterilizing chamber 3 was observed through an endoscope, practically no drain water was found in Experimental Examples 4, 5 and 6 and hence there occurred no reboiling phenomenon. The inside of the trays was heated to temperature sufficiently high for sterilization. In Comparative Example 3, on the other hand, the temperature in the inside of the trays was rather low near the outlet port of the heating and sterilizing chamber 3 because air strayed into the chamber and hence they were not heated to a sufficiently high temperature level. In short, in a food heating and sterilizing apparatus according to the invention, the heating and sterilizing chamber can be effectively drained and the food in the chamber can be stably heated to a temperature level necessary for sterilization.

TABLE 3

| steam pressure difference (kg/cm²) *1 | temperature in trays (°C.)*2 | | | vapor supply port (upper portion) | heating and sterilizing chamber lateral side | vapor exhaust port (lower portion) |
|---|---|---|---|---|---|---|
| | inlet | center | outlet | | | |
| | | | | Experimental Example 4 | | |
| +0.05 | 130 | 129 | 128 | 131 | 130 | 130° C. |
| | | | | Experimental Example 5 | | |
| +0.15 | 130 | 130 | 130 | 132 | 130 | 130° C. |
| | | | | Experimental Example 6 | | |
| +0.3 | 129 | 129 | 129 | 134 | 133 | 130° C. |
| | | | | Comparative Example 3 | | |
| 0 (no exhausting) | 129 | 127 | 124 | 130 | 129 | 126° C. |

*1: The difference between the pressure of steam supplied by the steam supply means and the predetermined internal pressure of heating and sterilizing chamber.
*2: The temperature in the inside of each tray was measure by arranging a movable thermometer in the inside in place of boiled rice and measured while the tray was moving in the heating and sterilizing chamber.

Figure 9:
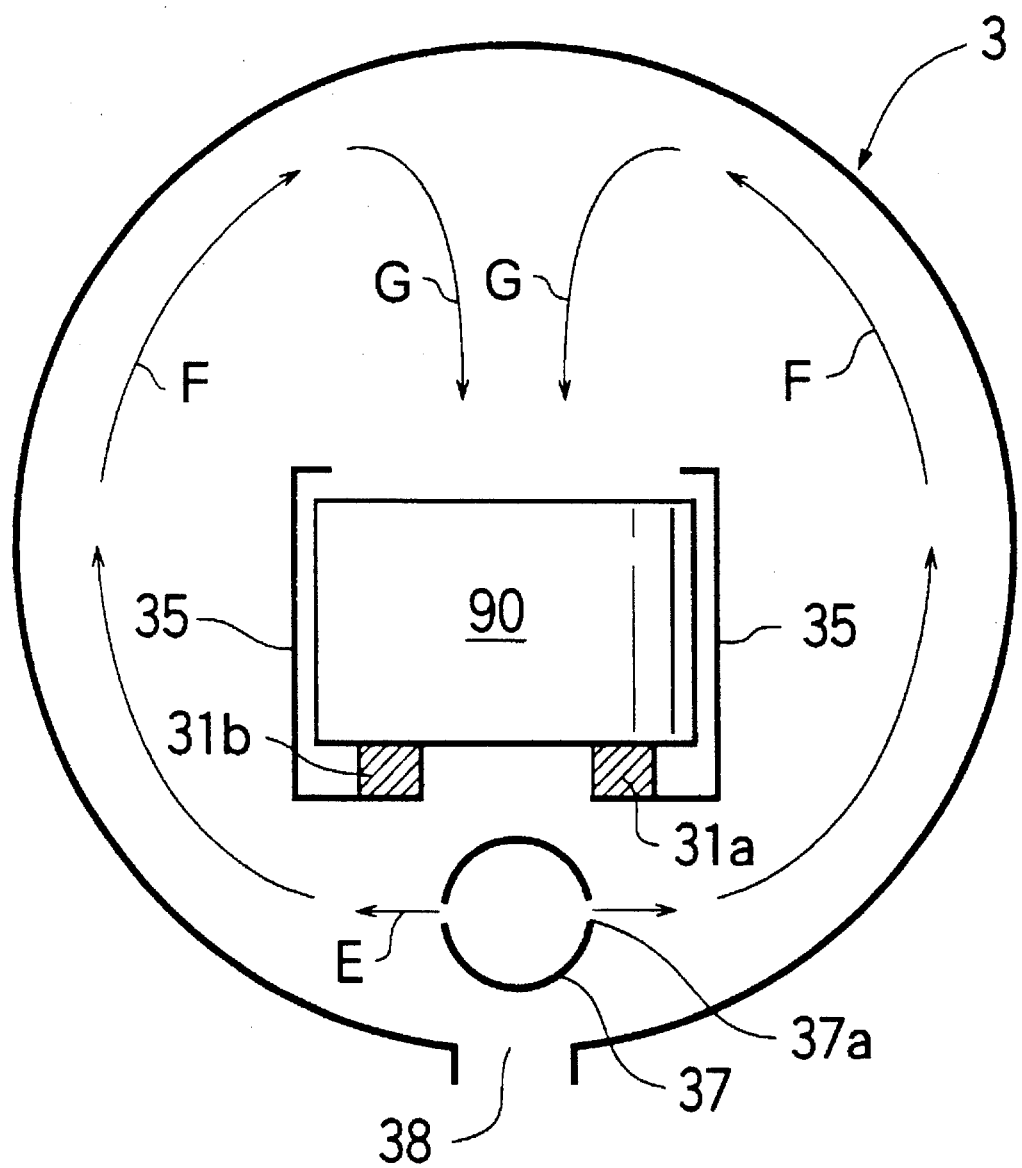
FIG. 9 is a schematic transversal cross sectional view of the heating and sterilizing chamber of the second embodiment of the apparatus for heating and sterilizing food according to the invention, showing a modified form of the heating and sterilizing means.
Figure 10:
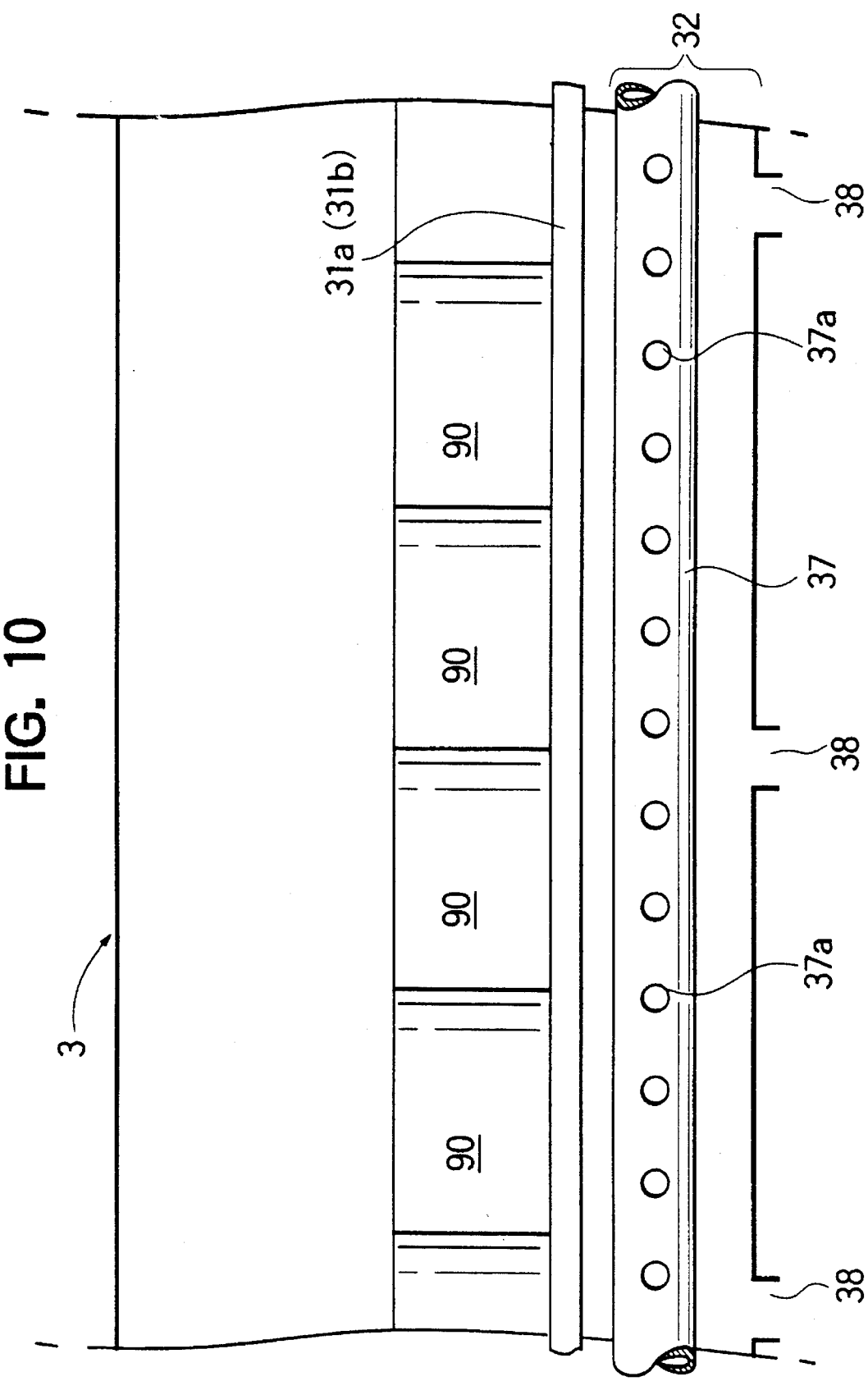
FIG. 10 is a schematic partial longitudinal cross sectional view of the heating and sterilizing chamber of the second embodiment of the apparatus for heating and sterilizing food according to the invention, showing a modified form of the heating and sterilizing means.

FIGS. 9 and 10 illustrate a modified steam supply means 32. This modified steam supply means 32 comprises a steam supply pipe 37 arranged below a pair of rails 31a, 31b for moving trays 90 and drain holes 38 arranged at the bottom of the heating and sterilizing chamber 3. The steam supply pipe 37 extends substantially along the entire length of the heating and sterilizing chamber 3 and is provided with a plurality of steam blow out ports 37a. The drain holes 38 are used to draw unnecessary fluid out of the heating and sterilizing chamber 3.

The steam supply means operates in a manner as described below. The steam supply pipe 37 is connected to a steam source and a pressure reducing valve (not shown) and steam is supplied therethrough with a predetermined pressure level. Steam arriving the steam supply pipe 37 is then laterally blown out into the heating and sterilizing chamber 3 through the steam blow out ports 37a along arrows E to collide with and run upward along the lateral wall of the cylindrical heating and sterilizing chamber 3 as indicated by arrows F. The flow of steam is then turned downward above the transfer route of the tray 90 and hits the tray 90 from above substantially vertically. Thereafter, the flow of steam passes through the hole 90 of the tray 90 and runs out of the heating and sterilizing chamber 3 through the drain holes 38 at the bottom of the chamber with drain water, if any.

Now, a third embodiment of food sterilizing apparatus will be described by referring to FIG. 11. Since the food sterilizing apparatus 200 of this embodiment is substantially similar to the food sterilizing apparatus 100 of the second embodiment, only the difference between the two embodiments will be described hereinafter and the components similar to those of the first embodiment will be denoted by the same reference numerals that are prefixed by 2 or 20 and their descriptions will be omitted.

Figure 11:
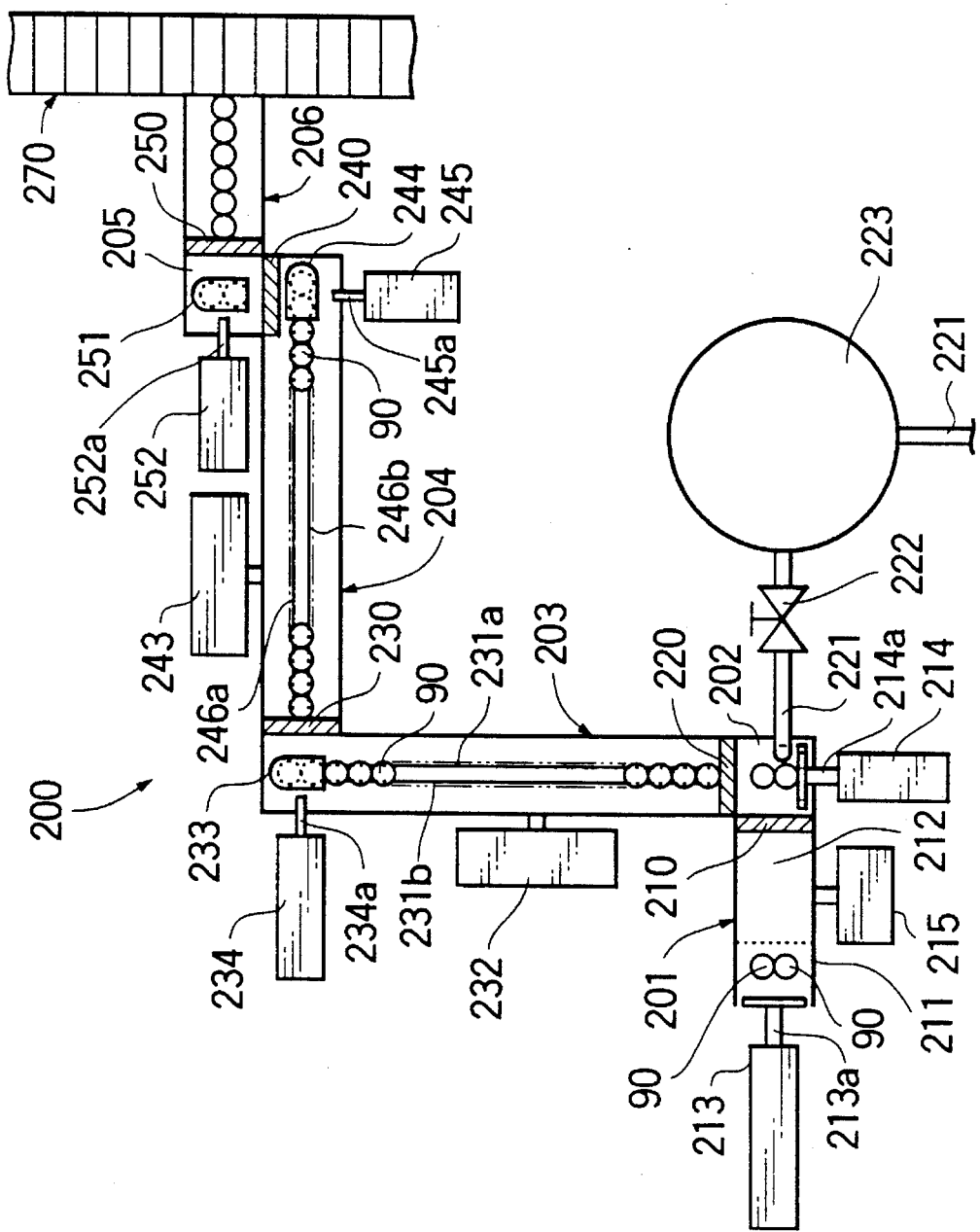
FIG. 11 is a schematic plan view of a third embodiment of the apparatus for heating and sterilizing food according to the invention, showing its overall configuration.

As seen from FIGS. 4 and 11, the food sterilizing apparatuses 100 and 200 are different in the way how the food feeding sections 1 and 201, the heating and sterilizing chambers 3 and 203 and the cooling chambers 4 and 204 are connected. In the food sterilizing apparatus 100, the food feeding section 1, the heating and sterilizing chamber 3 and the cooling chamber 4 are arranged and connected in such a way that the directions along which trays are moved respectively in the food feeding section 1, the heating and sterilizing chamber 3 and the cooling chamber 4 are parallel to each other and, therefore, a pair of trays are transferred forward at the junctions by means of a pair of pusher devices (e.g., 14 and 26) and a turn table (e.g., 24) such that they appear like a "crank" there.

On the other hand, in the food sterilizing apparatus 200, the food feeding section 201 and the heating and sterilizing chamber 203 are arranged perpendicularly relative to each other so that trays moving therethrough turns rectangularly at the junction thereof. Likewise, the heating and sterilizing chamber 203 and the cooling chamber 204 are arranged perpendicularly relative to each other so that trays moving therethrough turns rectangularly again at the junction thereof.

As a result, the pressure upward regulating chamber 202 does not require a turn table for the operation of the food sterilizing apparatus 200 while the junctions require only single pusher devices (214, 234 respectively) in order to transfer trays forward.

As described above in detail, with a food heating and sterilizing method and a food heating and sterilizing apparatus according to the invention, food can be heated and sterilized effectively and efficiently without being deteriorated.

What is claimed is:
1. An apparatus for heating and sterilizing food comprising: a food feeding section;
   a pressure upward regulating chamber;
   a heating and sterilizing chamber for heating and sterilizing food under pressure higher than atmospheric pressure;
   a cooling chamber for cooling the heated and sterilized food;
   a pressure downward regulating chamber and a delivery section for discharging food arranged successively and connected by way of respective sealing gates;
   steam supply means for supplying steam; and
   drain means for draining unnecessary fluid out of the heating and sterilizing chamber;

the food being contained in rigid containers, each container having an opening facing upward and a hole formed in the bottom thereof, said hole having a size so that food cannot pass therethrough, wherein steam supplied from said steam supply means is applied to the food in each of said containers through said upward opening and flows downward through the container and out said hole; each of said containers being moved successively from said food feeding section to said heating and sterilizing chamber; and wherein said food feeding section, said heating and sterilizing chamber, said cooling chamber and said delivery section are arranged perpendicularly relative to or in parallel with each other and said food feeding section;

said pressure upward regulating chamber, said heating and sterilizing chamber, said cooling chamber, said pressure downward regulating chamber and said delivery section being provided at respective upstream portions thereof with a pusher device for pushing downstream said rigid containers.

* * * * *